US012238543B2

(12) United States Patent
Wu et al.

(10) Patent No.: US 12,238,543 B2
(45) Date of Patent: Feb. 25, 2025

(54) LOW-POWER WIDE AREA NETWORK INTEGRATED SENSING AND COMMUNICATION METHOD BASED ON CHANNEL SENSING AND REINFORCEMENT LEARNING

(71) Applicants: The Hong Kong University of Science and Technology (Guangzhou), Guangzhou (CN); Shenzhen University, Shenzhen (CN); China Mobile Information Technology Co., Ltd, Shenzhen (CN)

(72) Inventors: Kaishun Wu, Guangzhou (CN); Yongzhi Huang, Guangzhou (CN); Lu Wang, Shenzhen (CN); Xiaoshen Li, Shenzhen (CN); Hong Liu, Shenzhen (CN); Li Li, Shenzhen (CN); Min Sun, Shenzhen (CN)

(73) Assignees: The Hong Kong University of Science and Technology (Guangzhou), Guangzhou (CN); Shenzhen University, Shenzhen (CN); China Mobile Information Technology Co., Ltd, Shenzhen (CN)

( * ) Notice: Subject to any disclaimer, the term of this patent is extended or adjusted under 35 U.S.C. 154(b) by 0 days.

(21) Appl. No.: 18/911,949

(22) Filed: Oct. 10, 2024

(65) Prior Publication Data
US 2025/0039698 A1 Jan. 30, 2025

Related U.S. Application Data

(63) Continuation of application No. PCT/CN2024/086862, filed on Apr. 9, 2024.

(30) Foreign Application Priority Data

May 8, 2023 (CN) .......................... 202310510073.4

(51) Int. Cl.
H04W 24/02 (2009.01)
H04L 25/02 (2006.01)
H04L 41/16 (2022.01)

(52) U.S. Cl.
CPC ......... H04W 24/02 (2013.01); H04L 25/0254 (2013.01); H04L 41/16 (2013.01)

(58) Field of Classification Search
None
See application file for complete search history.

(56) References Cited

U.S. PATENT DOCUMENTS

2014/0192936 A1* 7/2014 Fukawa ............... H04B 7/0413
375/341
2024/0107429 A1* 3/2024 Challita ................ H04W 48/16

FOREIGN PATENT DOCUMENTS

| CN | 110445581 A | 11/2019 |
| CN | 111641570 A | 9/2020 |
| CN | 113517941 A | 10/2021 |

* cited by examiner

Primary Examiner — Faruk Hamza
Assistant Examiner — Cassandra L Decker
(74) Attorney, Agent, or Firm — George D. Morgan

(57) ABSTRACT

The invention provides a low-power wide area network integrated sensing and communication method based on channel sensing and reinforcement learning, and the method comprises the steps: receiving an uplink signal transmitted by a terminal node through a gateway receiver, demodulating the uplink signal through employing a soft demodulation algorithm, and obtaining a bit log-likelihood ratio; the deep reinforcement learning model completes channel reconstruction of the corresponding link during communication according to the bit log-likelihood ratio; and calculating the current optimal network configuration according to the reconstructed channel so as to distribute the current optimal network configuration to each terminal node during next (Continued)

downlink transmission. According to the method, the key environment information is mined by using the deep reinforcement learning model, so that the gateway can allocate optimal network configuration to different terminal nodes according to the current network environment condition, and the decoding capability of the gateway is improved.

8 Claims, 4 Drawing Sheets

LOW-POWER WIDE AREA NETWORK INTEGRATED SENSING AND COMMUNICATION METHOD BASED ON CHANNEL SENSING AND REINFORCEMENT LEARNING

CROSS-REFERENCE TO RELATED APPLICATIONS

The application claims priority to Chinese patent application No. 2023105100734, filed on May 8, 2023, the entire contents of which are incorporated herein by reference.

TECHNICAL FIELD

The present invention belongs to the field of communication technology, and particularly relates to a low-power wide-area network integrated sensing and communication method based on channel sensing and reinforcement learning.

BACKGROUND

With the continuous advancement of communication technology, both the wireless communication and wireless sensing fields are moving towards higher frequency bands, larger antenna arrays, and smaller devices. The hardware architecture, channel characteristics, and signal processing of both fields are becoming more and more similar, which creates objective conditions for integrated sensing and communications (ISAC).

ISAC means that the same set of devices are adopted or part of devices are shared in the same network environment to realize two functions of communication and sensing, thereby reducing the cost, the volume, and the power of the devices and allowing communication and sensing to complement each other. However, in conventional internet of things (IOT) terminal devices, various sensors are equipped to sense physical environment information, and then the sensed data is transmitted to a gateway node through IOT in an uplink manner for data processing. ISAC, as a novel IOT technology, can reduce the number and complexity of devices by integrating communication and sensing functions on the same platform, thereby improving the flexibility and real-time performance of the devices and reducing the number and cost of the devices. ISAC can provide a new solution for the fields such as internet of vehicles, smart factory, and intelligent healthcare of the industrial IOT ecosystem. Low-power wide-area network (LPWAN) technology is widely applied to IOT application scenarios with long-distance, low-power, and large number of connectivity requirements. There is an urgent need for the ISAC technology in the face of internet of everything with balanced power distance and communication throughput in many aspects.

Artificial intelligence (AI) has made tremendous progress in many fields in recent years, and it is also being applied to the field of wireless communications to address various technical challenges. Using the AI technology, it is possible to learn or explore appropriate strategies from large and complex data and adjust them dynamically according to the environment. Thus, the use of dynamic and powerful exploration capability of the AI technology can greatly promote the realization of low-power wide-area network integrated sensing and communications, but even then, many challenges still exist in this aspect. For example, it remains a significant problem to discover information about a wireless communication channel via a wireless signal, to enable an artificial intelligence model to reconstruct the channel by making use of the information, and to assist network communication based on the reconstructed channel.

SUMMARY

Embodiments of the specification aim to provide a low-power wide-area network integrated sensing and communications method based on channel sensing and reinforcement learning.

In order to solve the above technical problems, the embodiments of the present application are implemented in the following manner:

The present application provides a low-power wide-area network integrated sensing and communications method based on channel sensing and reinforcement learning, which comprises:
- receiving, by a gateway receiver, an uplink signal transmitted by a terminal node, and demodulating the uplink signal by using a soft demodulation algorithm to obtain a bit log-likelihood ratio;
- completing, by a deep reinforcement learning model, channel reconstruction of a corresponding link during communication according to the bit log-likelihood ratio to obtain a reconstructed channel; and
- calculating a current optimal network configuration according to the reconstructed channel so as to allocate the current optimal network configuration to terminal nodes during the next downlink transmission.

In one of the embodiments, demodulating the uplink signal by using a soft demodulation algorithm to obtain a bit log-likelihood ratio comprises:
determining a bit log-likelihood ratio calculated according to the uplink signal by a Bayes formula $$P(x \mid y) = \frac{P(y \mid x)P(x)}{P(y)},$$

wherein transmission probabilities p(x) of symbols are equal, so that the bit log-likelihood ratio of the $k^{th}$ bit is as follows:

$$LLR_k(Y) = \log\frac{P(x_k=0 \mid Y)}{P(x_k=1 \mid Y)} = \log\frac{\sum_{X_A, A \in \Omega_{k,0}} P(Y \mid X_A)}{\sum_{X_A, A \in \Omega_{k,1}} P(Y \mid X_A)}$$

where $\Omega_{k,0}$, $\Omega_{k,1}$ denotes sets of symbols with the $k^{th}$ bit equal to 0 and 1, respectively, and $\Omega = \{A^1, A^2, \ldots, A^W\}$ denotes a set of all possible symbols received;

wherein, under a model of an additive white Gaussian noise channel, a noise follows Gaussian distribution with zero mean $N(0, \sigma^2)$, and based on a maximum a posteriori criterion, for a demodulation result, there is a conditional probability $P(Y \mid X_{A^\omega})$:

$$P(Y \mid X_{A^\omega}) = \frac{1}{\sqrt{2\pi}\sigma}\exp\left\{-\frac{|Y - X_{A^\omega}|^2}{2\sigma^2}\right\}$$

where Y denotes an actual signal received by the receiver, and $X_{A^\omega}$ denotes a modulated signal of the symbol $A^\omega \in \Omega$.

In one of the embodiments, completing, by a deep reinforcement learning model, channel reconstruction of a corresponding link during communication according to the bit log-likelihood ratio to obtain a reconstructed channel comprises:
inputting the bit log-likelihood ratio into a deep reinforcement learning model to select key frequency points as pilot frequencies;
performing a channel estimation of the key frequency points based on the pilot frequencies according to a modulated channel model to obtain estimated channels of the key frequency points;
performing an original estimation of a complete channel according to the estimated channels of the key frequency points by an interpolation method to obtain an original estimated channel; and
performing N iterative estimations on the original estimated channel through N symbols acquired in a continuous time slice window, and reconstructing a complete channel of a corresponding link during communication to obtain a reconstructed channel.

In one of the embodiments, before actual communication, offline training is performed on the deep reinforcement learning model to obtain an initial deep reinforcement learning model used for the first round of communication during the actual communication;
The training for the initial deep reinforcement learning model comprises:
acquiring a simulation dataset, wherein the simulation dataset comprises the real channel generated by the simulation, the transmitted signal, the received signal, and the bit log-likelihood ratio obtained by the demodulation through the receiver; and
performing training on the deep reinforcement learning model by using the simulation dataset until an ending condition is reached to obtain the initial deep reinforcement learning model.

In one of the embodiments, during the actual communication, performing online reinforcement learning training on the deep reinforcement learning model comprises:
after one round of communication is completed, collecting communication performance parameters of the current round and communication performance parameters of the previous round; and
constructing a reward function for online training according to the communication performance parameters of the current round and the communication performance parameters of the previous round, and performing online reinforcement learning training on the deep reinforcement learning model.

In one of the embodiments, the communication performance parameters comprise: a symbol error rate and a bit error rate of the terminal node, and a global throughput and a communication latency in the regional network.

In one of the embodiments, an agent of the deep reinforcement learning model comprises:
an experience playback pool used for storing result data generated by an interaction between the agent and a low-power wide-area network environment, wherein the result data comprise a bit log-likelihood ratio of the current state, a bit log-likelihood ratio of the next state, an action output of the agent, and a reward for executing the action;
a sample batch composed of a plurality of the result data randomly sampled from the experience playback pool regularly, and used for training of an estimated network and a target network;
an estimated network outputting a state-action value after each iteration, and updating parameters of the estimated network after each iteration;
a target network outputting a state value after each iteration, and updating parameters of the target network by receiving the parameters of the estimated network after a preset time length; and
an optimizer used for calculating Loss according to the reward for performing the action, the state-action value, and the state value so as to adjust the parameters of the estimated network through back propagation of the Loss.

In one of the embodiments, the reward for performing the action is determined according to an offline reward function:

$$\text{reward} = \text{Distance}(\hat{H}, H) = \frac{1}{N} \sum_{p \leq \|H\|} |\hat{H}(p) - H(p)|^2$$

where $\hat{H}$ denotes a reconstructed channel, H denotes a real channel generated by simulation in the dataset, p denotes a frequency point position, $\|H\|=N$ denotes a total number of frequency points, $\hat{H}(p)$ denotes the reconstructed channel corresponding to the frequency point p, and H(p) denotes the real channel corresponding to the frequency point p.

In one of the embodiments, the method further comprises: during decoding, performing, by the gateway, decoding based on the bit log-likelihood ratio by using a soft-decision iterative decoding algorithm.

In one of the embodiments, performing decoding based on the bit log-likelihood ratio by using a soft-decision iterative decoding algorithm comprises:
constructing a factor graph structure based on check equation constraints of channel coding;
initializing an iteration variable based on the bit log-likelihood ratio to obtain an initial iteration variable;
performing message passing according to the factor graph structure and the initial iteration variable, and updating variable nodes;
obtaining, by the variable node, decision results for all bits according to a decision rule; and
determining a decoding result according to the decision results.

As can be seen from the technical solutions provided in the embodiments of the present specification, in the solutions: the deep reinforcement learning model is utilized to discover key environment information, so that the gateway can allocate an optimal network configuration to different terminal nodes according to the current network environment condition, and the decoding capability of the gateway is improved.

BRIEF DESCRIPTION OF DRAWINGS

In order to more clearly explain technical solutions in embodiments of the present specification or the prior art, the following will briefly introduce drawings needed in the description of the embodiments or the prior art. Obviously, the drawings in the following description are merely some embodiments described in the present specification. For those of ordinary skill in the art, other drawings can be obtained according to these drawings without any creative effort.

DETAILED DESCRIPTION OF THE EMBODIMENTS

The technical solutions in the embodiments of the present specification will be clearly and completely described below with reference to the drawings in the embodiments of the present specification to help those skilled in the art better understand the technical solutions of the present specification, and it is obvious that the described embodiments are only a part of the embodiments of the present specification but not all of them. Based on the embodiments of the present specification, all other embodiments obtained by those of ordinary skill in the art without creative effort shall fall within the protection scope of the present specification.

In the following description, for the purpose of explanation rather than limitation, specific details such as specific system architecture and technology are set forth in order to provide a thorough understanding of the embodiments of the present application. However, it should be clear to those skilled in the art that the present application can be implemented in other embodiments without these specific details. In other cases, detailed descriptions of well-known systems, apparatuses, circuits, and methods are omitted so as not to obscure the description of the present application with unnecessary details.

It will be apparent to those skilled in the art that various modifications and variations can be made in the specific embodiments of the present specification without departing from the scope or spirit of the present application. Other embodiments obtained from the specification will be apparent to those skilled in the art. The specification and embodiments are exemplary only.

As used herein, the terms "comprise", "include", "have", "contain", and the like are open-ended terms that mean including but not limited to.

In the present application, "parts" are parts by mass unless otherwise stated.

The present invention will be further described in detail below with reference to the drawings and embodiments.

Figure 1:
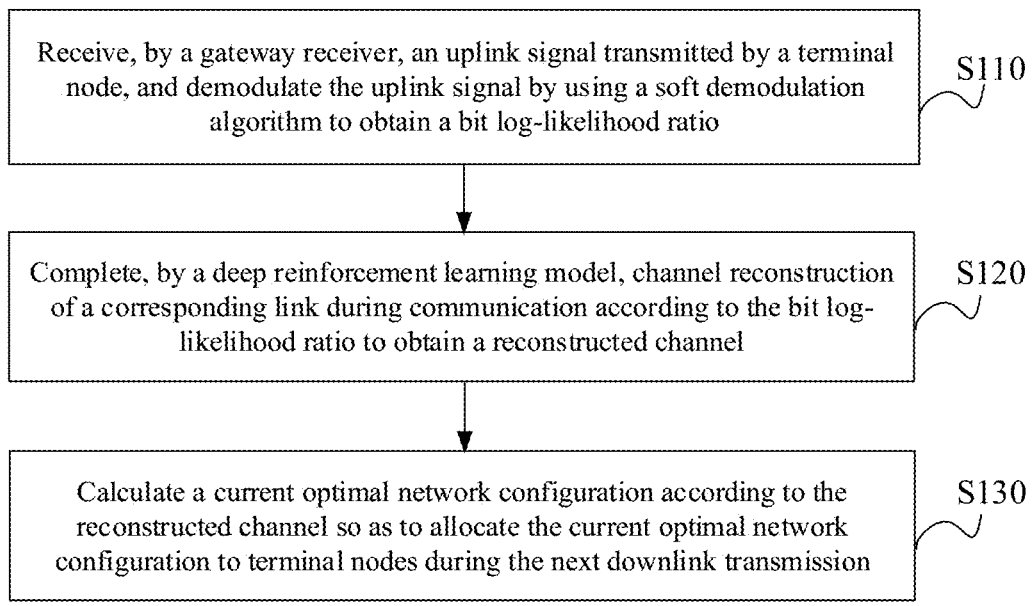
FIG. 1 is a schematic flowchart of a low-power wide-area network integrated sensing and communications method based on channel sensing and reinforcement learning according to the present application.
Figure 2:
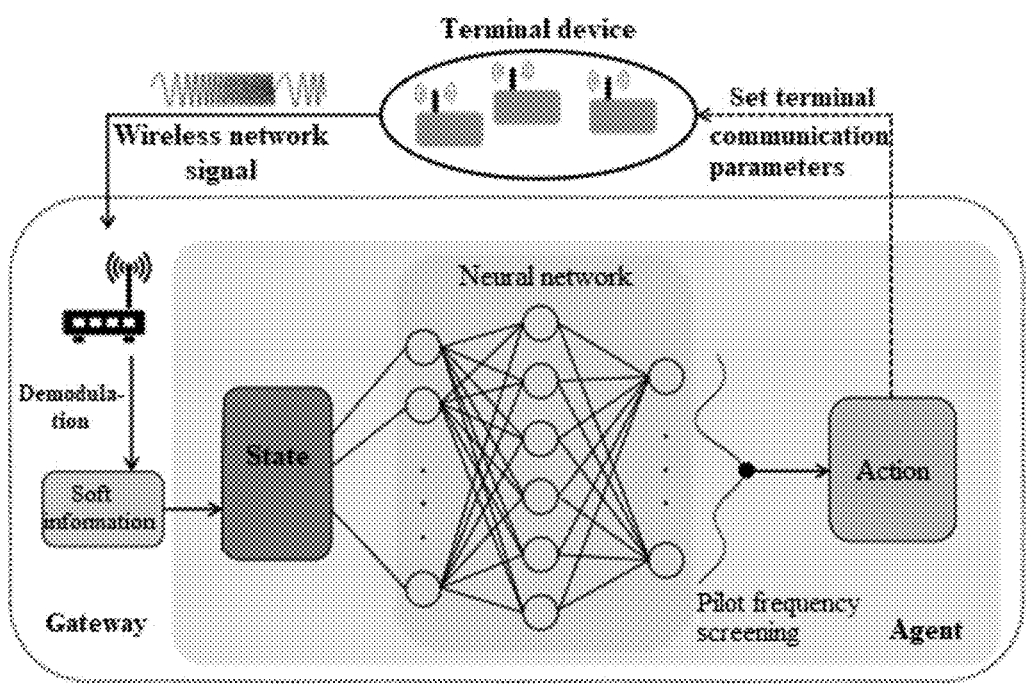
FIG. 2 is another schematic flowchart of a low-power wide-area network integrated sensing and communications method based on channel sensing and reinforcement learning according to the present application.

Referring to FIG. 1 and FIG. 2, schematic flowcharts applicable to a low-power wide-area network integrated sensing and communications method based on channel sensing and reinforcement learning according to an embodiment of the present application are shown.

As shown in FIG. 1 and FIG. 2, the low-power wide-area network integrated sensing and communications method based on channel sensing and reinforcement learning may comprise:

S110, an uplink signal transmitted by a terminal node is received by a gateway receiver, and the uplink signal is demodulated by using a soft demodulation algorithm to obtain a bit log-likelihood ratio.

Specifically, during actual communication, a terminal node of LPWAN communicates with a gateway through an uplink (that is, the terminal node transmits an uplink signal to the gateway), and the transmitted signal reaches the gateway receiver through a wireless channel; the gateway receiver receives a wireless uplink signal of the terminal node, the uplink signal is demodulated by using a soft demodulation algorithm, and a bit log-likelihood ratio (Bit LLR) is calculated as a demodulation result, the absolute value of which can characterize the confidence degree of the demodulation result.

Under a model of an additive white Gaussian noise channel, a noise follows Gaussian distribution with zero mean $N(0, \sigma^2)$, and a set of all possible symbols received is assumed to be $\Omega=\{A^1, A^2, \ldots, A^W\}$; based on a maximum a posteriori criterion, for a demodulation result, there is a conditional probability $P(Y|X_{A^\omega})$:

$$P(Y \mid X_{A^\omega}) = \frac{1}{\sqrt{2\pi}\sigma}\exp\left\{-\frac{|Y - X_{A^\omega}|^2}{2\sigma^2}\right\}$$

where Y denotes an actual signal received by the receiver, and $X_{A^\omega}$ denotes a modulated signal of the symbol $A^\omega \in \Omega$;

A bit log-likelihood ratio Bit LLR calculated according to the received uplink signal is determined by a Bayes formula $$P(x \mid y) = \frac{P(y \mid x)P(x)}{P(y)},$$

and because transmission probabilities p(x) of symbols are equal, the bit log-likelihood ratio of the $k^{th}$ bit is obtained as follows:

$$LLR_k(Y) = \log\frac{P(x_k = 0 \mid Y)}{P(x_k = 1 \mid Y)} = \log\frac{\sum_{X_A, A \in \Omega_{k,0}} P(Y \mid X_A)}{\sum_{X_A, A \in \Omega_{k,1}} P(Y \mid X_A)}$$

where $\Omega_{k,0}$, $\Omega_{k,1}$ denote sets of symbols with the $k^{th}$ bit equal to 0 and 1, respectively.

$P(Y|X_{A^\omega})$ is substituted into the above formula to yield a set of bit log-likelihood ratios $[l_1, l_2, \ldots, l_k]$, the absolute values of which can characterize the confidence degree of the demodulation result.

S120, channel reconstruction of a corresponding link during communication is completed by a deep reinforcement learning model according to the bit log-likelihood ratio to obtain a reconstructed channel.

In one embodiment, S120 may comprise:

inputting the bit log-likelihood ratio into a deep reinforcement learning model to select key frequency points as pilot frequencies;

performing a channel estimation of the key frequency points based on the pilot frequencies according to a modulated channel model to obtain estimated channels of the key frequency points;

performing an original estimation of a complete channel according to the estimated channels of the key frequency points by an interpolation method to obtain an original estimated channel; and performing N iterative estimations on the original estimated channel through N symbols acquired in a continuous time slice window, and reconstructing a complete channel of a corresponding link during communication to obtain a reconstructed channel.

Specifically, the gateway collects signals in a communication process in an active and passive mode, acquires the uplink signal from the terminal node and the demodulation result, and constructs a data record by a continuous time series of the received signal and the log-likelihood ratio according to a time slice window. A sliding window of N time slices is stored in the time slice window, which slides over time to maintain the time series continuity of the data within the window, and a certain number of symbols are collected for iteratively reconstructing the channel of the link.

The absolute value of the bit log-likelihood ratio is the confidence probability of decoding. The bit log-likelihood ratios in the same modulated symbol are normalized and then input into a deep reinforcement learning model (Deep Q-Network, DQN) as soft information, and key frequency points for reconstructing the channel were selected as pilot frequencies through a neural network (deep reinforcement learning model) to obtain a set of pilot frequencies $(p, X_k(p))$ with relatively high quality, where $p \in S_k$, $k=1, \ldots, N$, $S_k$ denotes a set of all pilot frequencies of the $k^{th}$ symbol, p denotes a frequency point position, and $X_k(p)$ denotes the modulated transmit signal corresponding to the frequency point p in the $k^{th}$ symbol.

A channel estimation of the key frequency points is performed according to a modulated channel model $Y=HX+N$ to obtain an estimated channel $\hat{H}_k(p)$ of the key frequency points:

$$\hat{H}_k(p) = \frac{Y_k(p)}{X_k(p)} = H(p) + N_k(p), p \in S_k, k = 1, \ldots, N$$

where $Y_k(p)$ denotes a received signal corresponding to the frequency point p in the $k^{th}$ symbol, $N_k(p)$ denotes an additive noise corresponding to the frequency point p in the $k^{th}$ symbol, and H(p) denotes a channel multiplicative influence corresponding to the frequency point p.

Finally, an original estimation of a complete channel is performed by using the estimated channels $(p, \hat{H}_k(p))$ of the key frequency points by an interpolation method to obtain an original estimated channel $\hat{H}_k$:

$$\hat{H}_k = interp\left(\bigcup_{p \in S_k} (p, \hat{H}_k(p))\right)$$

where $interp( )$ denotes an interpolation algorithm, for example, it may be a linear interpolation algorithm or other high-order interpolation algorithms.

An original estimation result $\tilde{H}_k$ is reconstructed through the estimated channels $\hat{H}_k$ obtained from the key frequency points:

$$\hat{H} = \sum_{k=1}^{N} \omega_k (\beta_k \hat{H}_k + (1-\beta_k) \tilde{H}_k), \sum_{k=1}^{N} \omega_k = 1$$

where $\omega_k$ denotes a weight coefficient of the $k^{th}$ symbol, and $\beta_k$ denotes an estimated weight coefficient of the key frequency points.

Then after iterations of N symbols, a channel $\hat{H}$ of the link is finally reconstructed.

Before actual communication, offline training needs to be performed on the DQN model, so that the model is used for the first round of communication during the actual communication, and during the actual communication, online reinforcement learning training needs to be performed on the deep reinforcement learning model.

In one embodiment, before actual communication, offline training is performed on the deep reinforcement learning model to obtain an initial deep reinforcement learning model used for the first round of communication during the actual communication.

The training for the initial deep reinforcement learning model comprises:
acquiring a simulation dataset, wherein the simulation dataset comprises the real channel generated by the simulation, the transmitted signal, the received signal, and the bit log-likelihood ratio obtained by the demodulation through the receiver; and
performing training on the deep reinforcement learning model by using the simulation dataset until an ending condition is reached to obtain the initial deep reinforcement learning model.

Specifically, the simulation dataset can be constructed in a high-performance server through communication flow based on MATLAB complete simulation of LPWAN by using various channel models such as Rayleigh channel and Ricean channel.

The ending condition may be that a preset number of times for training is reached, or that an offline reward function is stable and converged with no more violent bounces, which is not limited herein. The preset number of times for training can be set according to actual requirements.

In another embodiment, during the actual communication, performing online reinforcement learning training on the deep reinforcement learning model comprises:
after one round of communication is completed, collecting communication performance parameters of the current round and communication performance parameters of the previous round; and
constructing a reward function for online training according to the communication performance parameters of the current round and the communication performance parameters of the previous round, and performing online reinforcement learning training on the deep reinforcement learning model.

Specifically, according to the communication performance parameters $X_t$ of the current round t and the communication performance parameters $X_{t-1}$ of the previous round t-1, a reward function reward $(X_t, X_{t-1})$ for online training is constructed:

$$reward (X_t, X_{t-1}) = \sum_{i=1}^{\|x_t\|} \omega_i \left(\alpha_i \cdot \frac{|x_{t,i} - x_{t-1,i}|}{x_{t-1,i}} + (1-\alpha_i) \cdot \frac{|x_{t,i} - x_{t-1,i}|}{x_i^{max}}\right) \sum_{i=1}^{\|x_t\|} |\omega_i| = 1$$

where $X_t = (x_{t,i})$, $0 \le i \le \|X\|$ comprises communication performance indexes (parameters) such as a symbol error rate and a bit error rate of the terminal node, and a global throughput and a communication latency in the regional network, and $\omega_i$ and $\alpha_i$ both denote a weight coefficient.

Figure 3:
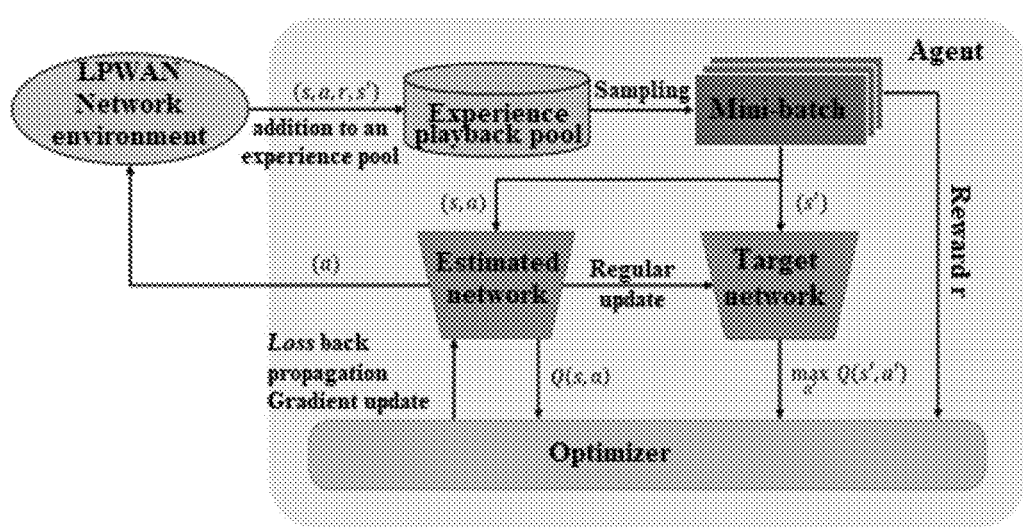
FIG. 3 is a schematic diagram of training of an agent in a deep reinforcement learning model according to the present application.

In yet another embodiment, as shown in FIG. 3, an agent of the deep reinforcement learning model comprises:

an experience playback pool used for storing result data generated by an interaction between the agent and a low-power wide-area network environment, wherein the result data comprise a bit log-likelihood ratio of the current state, a bit log-likelihood ratio of the next state, an action output of the agent, and a reward for performing the action; the reward for performing the action is determined according to an offline reward function:

$$\text{reward} = \text{Distance}\,(\hat{H}, H) = \frac{1}{N}\sum_{p \leq \|H\|} |\hat{H}(p) - H(p)|^2$$

where $\hat{H}$ denotes a reconstructed channel, H denotes a real channel generated by simulation in the dataset, p denotes a frequency point position, $\|H\|=N$ denotes a total number of frequency points, $\hat{H}(p)$ denotes the reconstructed channel corresponding to the frequency point p, and H(p) denotes the real channel corresponding to the frequency point p;

a sample batch composed of a plurality of the result data randomly sampled from the experience playback pool regularly, and used for training of an estimated network and a target network;

an estimated network outputting a state-action value after each iteration, and updating parameters of the estimated network after each iteration;

a target network outputting a state value after each iteration, and updating parameters of the target network by receiving the parameters of the estimated network after a preset time length; and an optimizer, used for calculating Loss according to the reward for performing the action, the state-action value, and the state value so as to adjust the parameters of the estimated network through the back propagation of the Loss.

Specifically, each interaction between the agent and the LPWAN network environment generates a record (s, a, r, s'), which is inserted into the experience playback pool (or experience pool for short), where state s denotes the Bit LLR of the current moment; s' denotes the Bit LLR of the next moment; a represents the action output of the agent, namely the pilot frequency screening result output by the deep reinforcement learning model (or the model for short), and r denotes the reward for performing an action, which is calculated according to an offline reward function:

$$\text{reward} = \text{Distance}\,(\hat{H}, H) = \frac{1}{N}\sum_{p \leq \|H\|} |\hat{H}(p) - H(p)|^2$$

where $\hat{H}$ denotes a reconstructed channel, H denotes a real channel generated by simulation in the dataset, p denotes a frequency point position, $\|H\|=N$ denotes a total number of frequency points, $\hat{H}(p)$ denotes the reconstructed channel corresponding to the frequency point p, and H(p) denotes the real channel corresponding to the frequency point p.

When the records reach a certain number, the model randomly samples a small batch of records from the experience pool regularly in the form of experience pool playback to form a Mini-batch for training, then a gradient descent optimizer calculates Loss so as to adjust the weight of the estimated network through back propagation of the Loss, so that a round of training is completed. The calculation formula for the Loss of the training is as follows:

$$\text{Loss} = {}_{Loss}\!\left(Q^{\theta}(s, a), r + \gamma \max_{a'_i} Q^{\theta'}(s', a'_i)\right)$$

where Q(s, a) denotes a state-action value corresponding to the current state and an executed action a, and Q(s, a) is transmitted to the optimizer by the estimated network;

$$\max_{a'_i} Q^{\theta'}(s', a'_i)$$

denotes selecting an executed action $a_i'$ which maximizes a Q value among all actions in the next state s', and the selected maximum Q value is transmitted to the optimizer by the target network; θ denotes a weight coefficient of the estimated network, and θ' denotes a weight coefficient of the target network; γ denotes a discount coefficient, which is used for quantifying the degree of influence of the future on the current.

Finally, after a certain number of rounds of iterations (the number of rounds can be set according to actual requirements) are performed, the agent can master channel characteristics corresponding to different bit log-likelihood ratios, and can select the key frequency points as pilot frequencies to reconstruct the channel.

In this embodiment, an experience playback pool (or an experience pool for short) is used to construct a Mini-batch for training, so that the correlation between samples is broken and the samples are independent of each other. The estimated network and the target network are set to reduce random bounces and disturbances introduced during training, the estimated network updates network weights (namely network parameters) by using the calculated Q value after each iteration, and the target network regularly updates parameters by receiving the weights of the estimated network regularly, with the updating maintained at a relatively slow speed, so that the stability and the convergence of the training are finally ensured.

S130, a current optimal network configuration is calculated according to the reconstructed channel so as to be allocated to terminal nodes during the next downlink transmission.

Specifically, a complete reconstructed channel $\hat{H}^e$ of each link is reconstructed based on each terminal node $e \in E = \{ed_1, \ldots, ed_m\}$ in the local area, and a network configuration of the terminal node in the next round of communication is obtained through an action output layer of the DQN agent:

$$A^e = \text{AgentAction}(\hat{H}^e)$$

where $A^e = (a_i^e)$, $1 \leq i \leq \|A\|$ denotes configuration parameters $a_i^e$ of the next round of communication of a terminal e, including a data rate, transmission power, communication band selection, a coding rate CR, and the like, where $\|A\|$ denotes the length of A.

During downlink transmission, the gateway transmits the configuration information to the terminal nodes to realize overall optimal transmission of the local network.

In one embodiment, during decoding, performing, by the gateway, decoding based on the bit log-likelihood ratio by using a soft-decision iterative decoding algorithm comprises:

constructing a factor graph structure based on check equation constraints of channel coding;

initializing an iteration variable based on the bit log-likelihood ratio to obtain an initial iteration variable;

performing message passing according to the factor graph structure and the initial iteration variable, and updating variable nodes;

obtaining decision results for all bits according to a decision rule by the variable node after updating; and determining a decoding result according to the decision results.

Specifically, constructing a factor graph structure based on check equation constraints of channel coding comprises:

For a check matrix, each row corresponds to one check node $f_i$ (namely one check equation constraint), and each column corresponds to one variable node $b_j$; a check constraint is denoted by $P=Hc^T$.

For example, for a check matrix H:

$$H = \begin{bmatrix} 1 & 1 & 0 & 1 \\ 1 & 0 & 1 & 1 \\ 0 & 1 & 1 & 1 \end{bmatrix}$$

Figure 4:
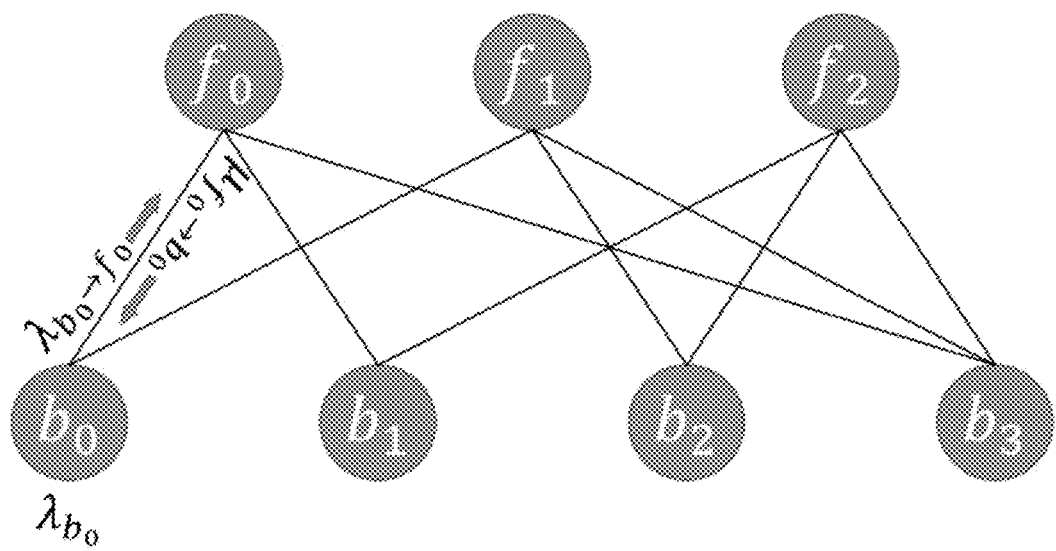
FIG. 4 is a schematic structural diagram of a factor graph structure according to the present application.

The corresponding factor graph structure of the check matrix is shown in FIG. 4.

An iteration variable $\lambda_{b_j}$ is: $\lambda_{b_j} = \lambda_{b_k \to f_i} = LLR(b_j)$ corresponding to a variable node $b_j$ (for the representation of a bit $b_j$ in a soft-decision iterative decoding algorithm) is initialized, where $LLR(b_j)$ denotes the Bit LLR for the bit $b_j$, and $\lambda_{b_k \to f_i}$ denotes message passing from the variable node to a check node.

Then message passing is performed according to the factor graph structure, and a message passing from the check node to the variable node is as follows:

$$\mu_{f_i \to b_j} = F^{-1}\left(\prod_{b_k \in N(f_i)\backslash b_j} F(\lambda_{b_k \to f_i})\right)$$

where $f_i \to b_j$ denotes the message passing from the check node $f_i$ to the variable node $b_j$, $b_k \in N(f_i)\backslash b_j$ denotes other variable nodes connected with $f_i$ after $b_j$ is removed, and F denotes a function tanh(·).

A message passing from the variable node to the check node is as follows:

$$\lambda_{b_j \to f_i} = \lambda_{b_j} + \sum_{f_k \in N(b_j)\backslash f_i} \mu_{f_k \to b_j}(x)$$

Finally, the variable node is updated according to the previously passed message:

$$\lambda_{b_j} = \lambda_{b_j} + \sum_{f_k \in N(b_j)} \mu_{f_k \to b_j}(x)$$

The variable node after updating obtains decision results $c = [c_0, c_1, \ldots, c_M]$ for all bits according to a decision rule $$c_j = \begin{cases} 0, & \lambda_{b_j} \leq 0 \\ 1, & \lambda_{b_j} > 0 \end{cases},$$

and when the constraints $Hc^T=0$ of the check equation are satisfied (H denotes a check matrix, c denotes a bit vector obtained by the decision, and 0 denotes a zero vector) or the number of rounds of iterations reach a set maximum limit, the decoding result is output, otherwise the iteration continues.

The low-power wide-area network integrated sensing and communications method based on channel sensing and reinforcement learning provided by the embodiments of the present application is based on a mode of LPWAN integrated sensing and communications at a physical layer, which allows an LPWAN gateway to discover key environment information and perform a more accurate reconstruction prediction of a channel, thereby realizing the assistance of its communication. The traditional LPWAN modulation and demodulation technology can only realize sensing by using a preamble, and this method is insensitive to perturbation of a network and has poor stability. In the present application, a soft demodulation algorithm for integrated sensing and communications is designed, which, in combination with the deep reinforcement learning technology, allows an LPWAN gateway to possess the sensing capability on a wireless signal, thereby improving the overall communication transmission performance of a local LPWAN network. In actual LPWAN communication, a gateway receiver receives a wireless signal from a terminal node, and during demodulation, extracts an effective confidence degree characterized by Bit LLR from the wireless signal by using the soft demodulation algorithm for LPWAN integrated sensing and communications based on a maximum likelihood estimation, thereby realizing the sensing of a wireless channel. Subsequently, the DQN model is used to analyze and learn the Bit LLR, and the key frequencies are selected as the pilot frequencies to make a more accurate reconstruction prediction of the channel. Finally, based on the channel information, the optimal communication configuration of terminal nodes in the current LPWAN network is calculated. Based on LPWAN integrated sensing and communications at a physical layer, the gateway can make use of the sensing of the current network environment to greatly improve its decoding ability and optimize the communication configuration of the terminal nodes. Through continuous iterations of the model in the network system, dynamically adaptive overall optimal communication transmission in a local LPWAN network can finally be realized.

It should be noted that the terms "include", "comprise", or any other variation thereof, are intended to cover a non-exclusive inclusion, such that a process, method, article, or device including a list of elements includes not only those elements, but also other elements not expressly listed or inherent to such process, method, article, or device. Without further limitation, an element defined by the phrase "comprising an . . . " does not exclude the presence of other identical elements in the process, method, article, or device that includes the element.

All the embodiments in the specification are described in a progressive way, the same and similar parts of the embodiments can be referred to each other, and each embodiment focuses on the differences from other embodiments. In particular, as system embodiments are substantially similar to method embodiments, they are described in a relatively brief manner, and reference may be made to some descriptions of the method embodiments for related points.

What is claimed is:

1. A low-power wide-area network integrated sensing and communications method based on channel sensing and reinforcement learning, comprising:

receiving, by an LPWAN (low-power wide-area network) gateway receiver, an uplink signal transmitted by a terminal node, and demodulating the uplink signal by using a soft demodulation algorithm, wherein for a demodulation result, under a model of an additive white Gaussian noise channel, a noise follows Gaussian distribution with zero mean N(0, $\sigma^2$), and based on a maximum a posteriori criterion, there is a conditional probability $P(Y|X_{A^\omega})$:

$$P(Y|X_{A^\omega}) = \frac{1}{\sqrt{2\pi}\sigma}\exp\left\{-\frac{|Y-X_{A^\omega}|^2}{2\sigma^2}\right\}$$

where Y denotes an actual signal received by the receiver, and $X_{A^\omega}$ denotes a modulated signal of the symbol $A^\omega \in \Omega$;

determining a bit log-likelihood ratio calculated according to the uplink signal by a Bayes formula $$P(x|y) = \frac{P(y|x)P(x)}{P(y)},$$

wherein transmission probabilities p(x) of symbols are equal, formula so that the bit log-likelihood ratio of the $k^{th}$ bit is as follows:

$$LLR_k(Y) = \log\frac{P(x_k=0|y)}{P(x_k=1|y)}$$
$$= \log\frac{\sum_{X_A,A\in\Omega_{k,0}} P(Y|X_A)}{\sum_{X_A,A\in\Omega_{k,1}} P(Y|X_A)}$$

where $\Omega_{k,0}$, $\Omega_{k,1}$ denotes sets of symbols with the $k^{th}$ bit equal to 0 and 1, respectively, and $\Omega=\{A^1, A^2, \ldots, A^W\}$ denotes a set of all possible symbols received;

thereby obtaining a set of bit log-likelihood ratios and realizing sensing of a wireless channel;

selecting, by a deep reinforcement learning model, key frequency points as pilot frequencies according to the bit log-likelihood ratio;

performing a channel estimation of the key frequency points based on the pilot frequencies according to a modulated channel model to obtain estimated channels of the key frequency points;

performing an original estimation of a complete channel according to the estimated channels of the key frequency points by an interpolation method to obtain an original estimated channel; and performing N iterative estimations on the original estimated channel through N symbols acquired in a continuous time slice window, and completing reconstruction of a complete channel of a corresponding link during communication to obtain a reconstructed channel;

calculating a current optimal network configuration according to the reconstructed channel so as to allocate the current optimal network configuration to terminal nodes during the next downlink transmission;

before actual communication, performing offline training on the deep reinforcement learning model by using the following reward function (1), so that the model is used for the first round of communication during actual communication:

$$\text{reward} = \text{Distance}(\hat{H}, H) = \frac{1}{N}\sum_{p\leq\|H\|}|\hat{H}(p)-H(p)|^2 \quad (1)$$

during the actual communication, performing online reinforcement learning training by using the following reward function (2), so that dynamically adaptive overall optimal communication transmission in a local LPWAN network is finally realized through continuous iterations:

$$\text{reward}(X_t, X_{t-1}) = \qquad (2)$$
$$\sum_{i=1}^{\|x_t\|}\omega_i\left(\alpha_i \cdot \frac{|x_{t,i}-x_{t-1,i}|}{x_{t-1,i}} + (1-\alpha_i)\cdot\frac{|x_{t,i}-x_{t-1,i}|}{x_i^{max}}\right)\sum_{i=1}^{\|x_t\|}|\omega_i|=1$$

where $\hat{H}$ denotes a reconstructed channel, H denotes a real channel generated by simulation in the dataset, p denotes a frequency point position, $\|H\|=N$ denotes a total number of frequency points, $\hat{H}(p)$ denotes the reconstructed channel corresponding to the frequency point p, H(p) denotes the real channel corresponding to the frequency point p, $X_{t-1}$ denotes communication performance parameters for the previous round t−1, $X_t$ denotes communication performance parameters for the current round t, and $X_t=(x_{t,i})$, $0\leq i\leq\|X\|$, $\omega_i$, and $\alpha_i$ are all weight coefficients.

2. The method according to claim 1, wherein before the actual communication, performing offline training on the deep reinforcement learning model to obtain an initial deep reinforcement learning model used for the first round of communication during the actual communication, wherein the training for the initial deep reinforcement learning model comprises:

acquiring a simulation dataset, wherein the simulation dataset comprises the real channel generated by the simulation, the transmitted signal, the received signal, and the bit log-likelihood ratio obtained by the demodulation through the receiver; and performing training on the deep reinforcement learning model by using the simulation dataset until an ending condition is reached to obtain the initial deep reinforcement learning model.

3. The method according to claim 2, wherein an agent of the deep reinforcement learning model comprises:

an experience playback pool used for storing result data generated by an interaction between the agent and a low-power wide-area network environment, wherein the result data comprise a bit log-likelihood ratio of the current state, a bit log-likelihood ratio of the next state, an action output of the agent, and a reward for executing the action;

a sample batch composed of a plurality of the result data randomly sampled from the experience playback pool regularly, and used for training of an estimated network and a target network;

an estimated network outputting a state-action value after each iteration, and updating parameters of the estimated network after each iteration;
a target network outputting a state value after each iteration, and updating parameters of the target network by receiving the parameters of the estimated network after a preset time length; and
an optimizer used for calculating Loss according to the reward for performing the action, the state-action value, and the state value so as to adjust the parameters of the estimated network through back propagation of the Loss.

4. The method according to claim 1, wherein the communication performance parameters comprise: a symbol error rate and a bit error rate of the terminal node, and a global throughput and a communication latency in the regional network.

5. The method according to claim 4, wherein an agent of the deep reinforcement learning model comprises:
an experience playback pool used for storing result data generated by an interaction between the agent and a low-power wide-area network environment, wherein the result data comprise a bit log-likelihood ratio of the current state, a bit log-likelihood ratio of the next state, an action output of the agent, and a reward for executing the action;
a sample batch composed of a plurality of the result data randomly sampled from the experience playback pool regularly, and used for training of an estimated network and a target network;
an estimated network outputting a state-action value after each iteration, and updating parameters of the estimated network after each iteration;
a target network outputting a state value after each iteration, and updating parameters of the target network by receiving the parameters of the estimated network after a preset time length; and
an optimizer used for calculating Loss according to the reward for performing the action, the state-action value, and the state value so as to adjust the parameters of the estimated network through back propagation of the Loss.

6. The method according to claim 1, wherein an agent of the deep reinforcement learning model comprises:
an experience playback pool used for storing result data generated by an interaction between the agent and a low-power wide-area network environment, wherein the result data comprise a bit log-likelihood ratio of the current state, a bit log-likelihood ratio of the next state, an action output of the agent, and a reward for executing the action;
a sample batch composed of a plurality of the result data randomly sampled from the experience playback pool regularly, and used for training of an estimated network and a target network;
an estimated network outputting a state-action value after each iteration, and updating parameters of the estimated network after each iteration;
a target network outputting a state value after each iteration, and updating parameters of the target network by receiving the parameters of the estimated network after a preset time length; and
an optimizer used for calculating Loss according to the reward for performing the action, the state-action value, and the state value so as to adjust the parameters of the estimated network through back propagation of the Loss.

7. The method according to claim 1, further comprising: during decoding, performing, by the gateway, decoding based on the bit log-likelihood ratio by using a soft-decision iterative decoding algorithm.

8. The method according to claim 7, wherein decoding based on the bit log-likelihood ratio by using a soft-decision iterative decoding algorithm comprises:
constructing a factor graph structure based on check equation constraints of channel coding;
initializing an iteration variable based on the bit log-likelihood ratio to obtain an initial iteration variable;
performing message passing according to the factor graph structure and the initial iteration variable, and updating variable nodes;
obtaining decision results for all bits according to a decision rule by the variable node after updating; and
determining a decoding result according to the decision results.

* * * * *